US012738733B2

(12) United States Patent
Shinohara

(10) Patent No.: US 12,738,733 B2
(45) Date of Patent: Sep. 15, 2026

(54) VEHICLE POWER SUPPLY DEVICE

(71) Applicant: TOYOTA JIDOSHA KABUSHIKI KAISHA, Toyota (JP)

(72) Inventor: Toshiki Shinohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/206,285

(22) Filed: May 13, 2025

(65) Prior Publication Data

US 2026/0012015 A1 Jan. 8, 2026

(30) Foreign Application Priority Data

Jul. 3, 2024 (JP) ................................ 2024-107706

(51) Int. Cl.
*H02J 1/10* (2026.01)
*H02J 105/30* (2026.01)
*H02J 105/52* (2026.01)

(52) U.S. Cl.
CPC ............. *H02J 1/10* (2013.01); *H02J 2105/30* (2026.01); *H02J 2105/52* (2026.01)

(58) Field of Classification Search
CPC ...... H02J 1/10; H02J 2105/30; H02J 2105/52; B60L 1/00; B60L 50/00
See application file for complete search history.

(56) References Cited

U.S. PATENT DOCUMENTS

2025/0362347 A1* 11/2025 Morita ..................... H02J 7/00

FOREIGN PATENT DOCUMENTS

JP 2010-213456 A 9/2010
JP 2021-180587 A 11/2021

* cited by examiner

*Primary Examiner* — Regis J Betsch
*Assistant Examiner* — Alex W Lam
(74) *Attorney, Agent, or Firm* — SoraIP, Inc.

(57) ABSTRACT

A vehicle power supply device for supplying electric power to a plurality of auxiliary loads mounted on a vehicle, comprising: a power supply source; an auxiliary battery including a lithium ion battery chargeable by the power supply source; a DDC provided between the power supply source and the plurality of auxiliary loads and controlling the power supply from the power supply source to the plurality of auxiliary loads; a switch provided between DDC and the plurality of auxiliary loads and the auxiliary battery, and switching an electrically connected status between the plurality of auxiliary loads and the auxiliary battery; and a control unit for controlling DDC and the switch, wherein the control unit controls the output voltage of DDC to be higher in the second voltage when the switch is shut off than the first voltage when the switch is turned on.

7 Claims, 7 Drawing Sheets

VEHICLE POWER SUPPLY DEVICE

CROSS-REFERENCE TO RELATED APPLICATION

This application claims priority to Japanese Patent Application No. 2024-107706 filed on Jul. 3, 2024. The disclosure of the above-identified application, including the specification, drawings, and claims, is incorporated by reference herein in its entirety.

BACKGROUND

1. Technical Field

The present disclosure relates to a power supply device that is installed in a vehicle.

2. Description of Related Art

Japanese Unexamined Patent Application Publication No. 2010-213456 (JP 2010-213456 A) discloses a vehicle power supply device that controls electric power supply from a traction battery to an auxiliary battery. In this vehicle power supply device, the electric power supply to the auxiliary battery is raised by controlling output voltage of a direct current (DC)-DC converter, based on operation of an electronic control braking system, which is one of auxiliary loads, and voltage of the auxiliary battery is suppressed from falling to a threshold value or lower.

SUMMARY

When a lithium-ion battery is employed as the auxiliary battery, a switch is commonly provided for disconnecting the auxiliary battery from a power supply system (DC-DC converter) in order to protect the lithium-ion battery. In a configuration in which the switch is interposed between the auxiliary battery and the DC-DC converter, when the switch is in a conducting state (electrically connected state), a power supply source for the auxiliary load is both the auxiliary battery and the DC-DC converter, and accordingly variance in power supply voltage that would be problematic does not readily occur even when electric power demand of the auxiliary load changes significantly. However, when the switch is in an interrupted state (a state in which the switch is not electrically connected), there is a problem in that the power supply source to the auxiliary load is only the DC-DC converter, and the power supply voltage readily varies under effects of great change in the electric power demand for the auxiliary load.

Accordingly, there is room for further study regarding a control technique for supplying electric power to the auxiliary load when the switch is in the interrupted state and the only power supply source for the auxiliary load is the DC-DC converter.

The present disclosure has been made in view of the above problem, and an object thereof is to provide a vehicle power supply device. The vehicle power supply device can suppress variance from occurring in power supply voltage that would affect operation of the auxiliary load, even when there is great change in the electric power demand for the auxiliary load when the only power supply source is the DC-DC converters.

In order to solve the above problems, an aspect of the present disclosure is a vehicle power supply device that supplies electric power to a plurality of auxiliary loads that is installed in a vehicle, the vehicle power supply device including

- a power supply source,
- an auxiliary battery, including a lithium-ion battery that is chargeable by the power supply source,
- a DC-DC converter that is provided between the power supply source and the auxiliary loads, and that controls electric power supply from the power supply source to the auxiliary loads, a switch that is provided between the DC-DC converter and the auxiliary loads, and the auxiliary battery, and that switches an electrical connection state between the auxiliary loads and the auxiliary battery, and
- a control unit that controls the DC-DC converter and the switch, wherein
- the control unit controls output voltage of the DC-DC converter such that a second voltage when the switch is interrupted is higher than a first voltage when the switch is conducting.

According to the above-described vehicle power supply device of the present disclosure, even when there is a great change in electric power demand for the auxiliary load when the switch interposed between the auxiliary battery and DC-DC converter is in an interrupted state, variance in power supply voltage that would affect the operation of the auxiliary load can be suppressed from occurring.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When the switch inserted between the auxiliary battery and DC-DC converter is in the disconnected state, the vehicle power supply device of the present disclosure controls the output-voltage of DC-DC converter to be higher than when the switch is in the conductive state. Accordingly, it is possible to suppress the power supply voltage from fluctuating due to a change in the large power demand of the auxiliary load when the switch is in the cutoff state.

Hereinafter, an embodiment of the present disclosure will be described in detail with reference to the drawings.

Embodiment

Configuration

Figure 1:
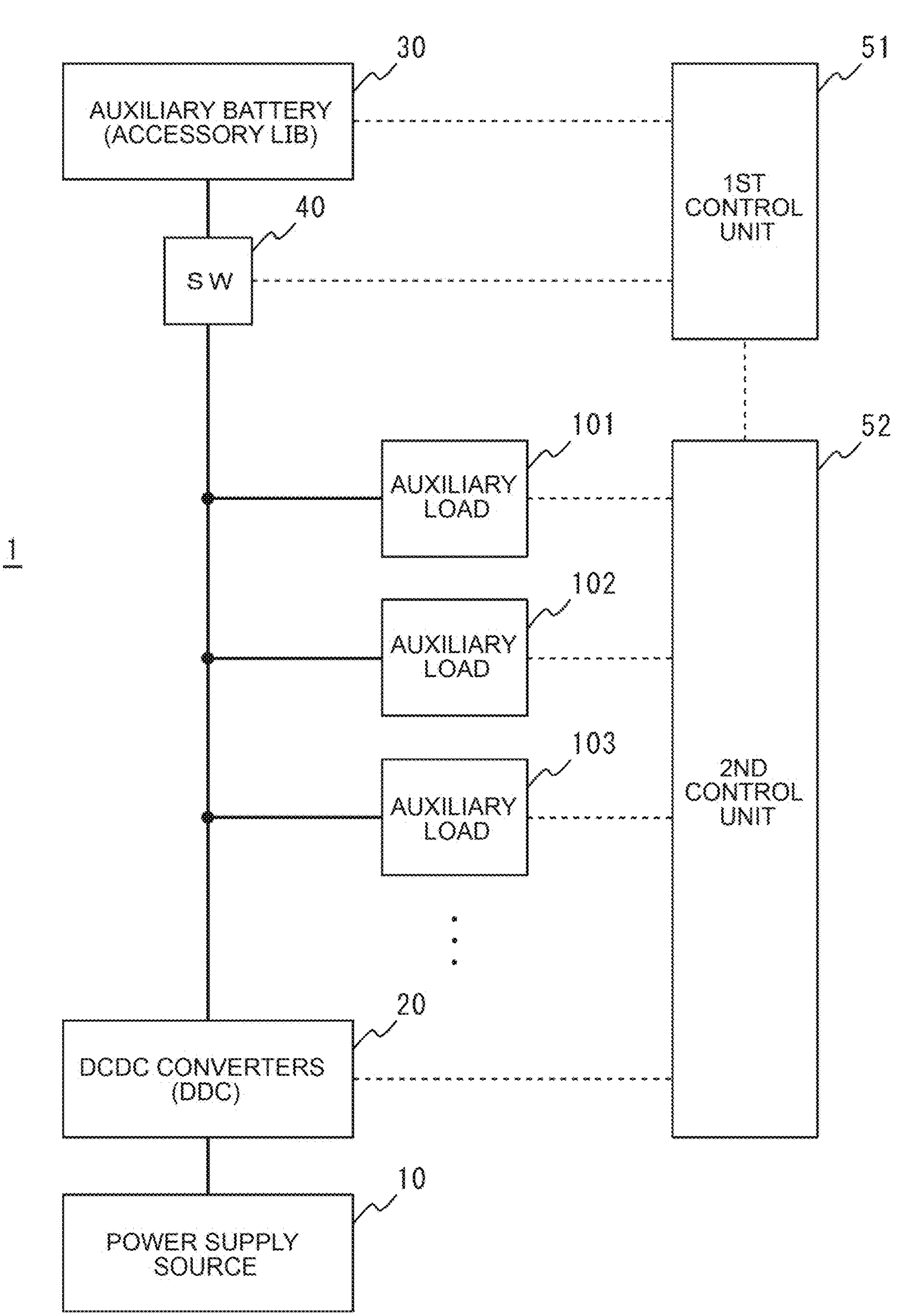
FIG. 1 is a schematic configuration diagram of a vehicle power supply device according to an embodiment of the present disclosure.

FIG. 1 is a diagram for explaining a schematic configuration of a vehicle power supply device 1 according to an embodiment of the present disclosure. The vehicle power supply device 1 is a device that supplies electric power for driving to the plurality of auxiliary loads 101, 102, and 103. The vehicle power supply device 1 illustrated in FIG. 1 includes a power supply source 10, a DC-DC converter (DDC) 20, an auxiliary battery (auxiliary LiB) 30, a switch (SW) 40, a first control unit 51, and a second control unit 52. In FIG. 1, wires to which electric power is transmitted and received are indicated by solid lines, and wires to which signals such as control, request, and notification are transmitted and received are indicated by dotted lines. The vehicle power supply device 1 and the plurality of auxiliary loads 101, 102, and 103 may be mounted on a vehicle or the like.

The power supply source 10 is configured to supply power to the plurality of auxiliary loads 101, 102, and 103 via DC-DC converters 20. The power supply source 10 is also configured to charge the auxiliary battery 30. As the power supply source 10, for example, a secondary battery (high-voltage battery) such as a lithium-ion battery configured to be chargeable and dischargeable, a generator (alternator) that generates electric power, or the like is used.

DC-DC converters 20 are power converters capable of converting the inputted power into a predetermined-voltage power and outputting the converted power. DC-DC converters 20 are connected at one end to a power supply source 10 and at the other end to a plurality of auxiliary loads 101, 102, and 103. DC-DC converters 20 can provide the power outputted by the power supply source 10 connected at one end to a plurality of auxiliary loads 101, 102, and 103 connected at the other end. The operation of DC-DC converters 20 is controlled by the second control unit 52.

The auxiliary battery 30 is a secondary battery configured to be chargeable and dischargeable by a lithium-ion battery (LiB). The auxiliary battery 30 is connected to DC-DC converters 20 so as to be able to charge the electric power of the electric power supply source 10 via the switches 40, and is connected to a plurality of auxiliary loads 101, 102, and 103 so as to be able to supply the electric power stored therein. The state of the auxiliary battery 30 is monitored by the first control unit 51.

The switch 40 is provided between DC-DC converters 20 and the plurality of auxiliary loads 101, 102, and 103 and the auxiliary battery 30. The switch 40 is a switch element (such as a semiconductor relay or a mechanical relay) capable of switching between an electrically conductive state and a disconnected state. The connection state of the switch 40 is controlled by the first control unit 51.

The auxiliary loads 101, 102, and 103 are predetermined in-vehicle devices that are driven by receiving power from DC-DC converters 20 (power supply source 10) and/or the auxiliary battery 30, and are, for example, electronic devices and equipment that are not involved in the traveling of vehicles. At least one of the plurality of auxiliary loads 101, 102, and 103 is a load that can require DC-DC converters 20 to increase the power it consumes intentionally. The number of auxiliary loads to be power supply destinations of the vehicle power supply device 1 is not limited to the three loads shown in FIG. 1.

The first control unit 51 has at least a function of monitoring the state of the auxiliary battery 30 and a function of controlling the connection state of the switch 40. The first control unit 51 can monitor, as the condition of the auxiliary battery 30, the occurrence of an abnormality (such as a ground fault or a sky fault) in the auxiliary battery 30 that cannot be connected to DC-DC converters 20. Further, the first control unit 51 can monitor whether the auxiliary battery 30 is in a charged state in which a current flows in or in a discharged state in which a current flows out. The state of the auxiliary battery 30 can be detected using a detection element (not shown) such as a voltage sensor or a current sensor provided in the auxiliary battery 30. Further, the first control unit 51 can control the connection state of the switch 40 to a conductive state using, for example, a predetermined ON signal for operating the switch 40, and can control the switch to a cutoff state using a predetermined OFF signal for deactivating the switch 40.

In addition, the first control unit 51 can notify the second control unit 52 that the switch 40 is disconnected or conductive when the switch 40 is controlled to the disconnected state or the conductive state is controlled. In addition, the first control unit 51 can receive a shut-off request for the switch 40 notified from the second control unit 52 and control the switch 40 to a shut-off state. Further, the first control unit 51 constantly monitors the output voltage of DC-DC converters 20, and can control the switches 40 to be conductive in accordance with a change in the output voltage.

The second control unit 52 is configured to include at least a function of controlling the operation of DC-DC converters 20 and a function of requesting the plurality of auxiliary loads 101, 102, and 103. The second control unit 52 may adjust the output-voltage of DC-DC converter 20 as the operation of DC-DC converter 20. More specifically, the second control unit 52 raises or lowers the output-voltage of DC-DC converters 20 in response to a notification received from the first control unit 51 or a request received from the plurality of auxiliary loads 101, 102, and 103. Further, the second control unit 52 can transmit, as a request for the plurality of auxiliary loads 101, 102, and 103, an instruction to temporarily restrict the fluctuation of the power demand in the auxiliary load or an instruction to cancel the restriction.

Further, the second control unit 52 is configured to be able to grasp the states of the plurality of auxiliary loads 101, 102, and 103, respectively, and to be able to acquire information such as the consumption amount of electric power (current) in each auxiliary load and the state of operation (scheduled operation) of the function. This information can be used to determine whether or not to transmit various requests to the plurality of auxiliary loads 101, 102, and 103.

The first control unit 51 and the second control unit 52 described above may be combined into one configuration or may be subdivided into configurations for each function. In addition, some or all of the functions of the first control unit 51 and the second control unit 52 may typically be configured as one or more electronic control units (ECU) including a processor, memories, an input/output interface, and the like. The electronic control unit configured as described above realizes the respective functions of the first control unit 51 and the second control unit 52 by the processor reading and executing the program stored in the memory.

Control

Next, the control executed by the vehicle power supply device 1 according to the present embodiment will be described with further reference to FIGS. 2 to 7.

1. SW Cutoff Determination Control

Figure 2:
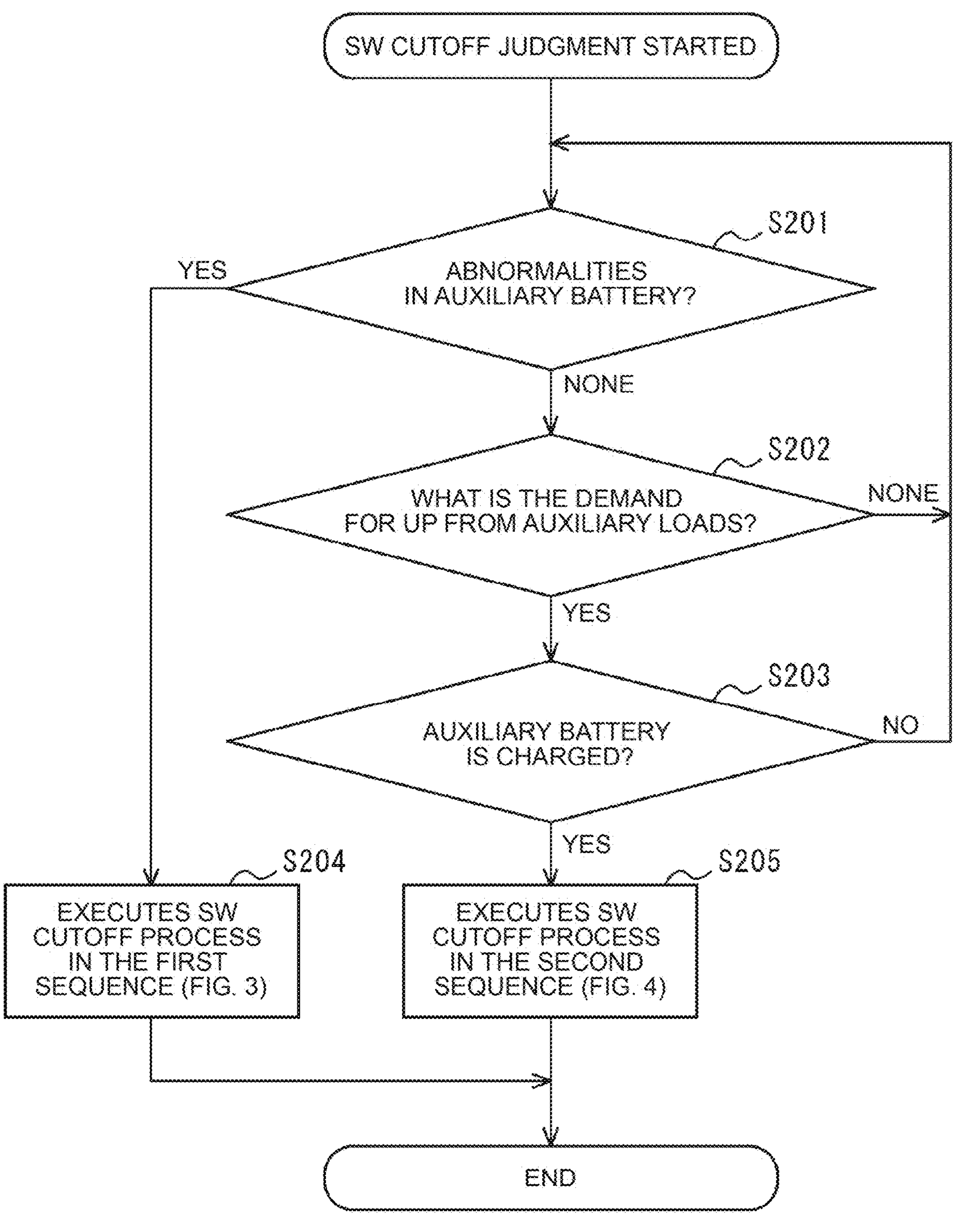
FIG. 2 is a processing flowchart of switch cutoff determination control performed by the vehicle power supply device.

FIG. 2 is a flow chart for explaining a process sequence of SW cutoff determination control executed by the first control unit 51 and the second control unit 52 of the vehicle power supply device 1. SW cutoff determination control illustrated in FIG. 2 is executed when the switch 40 is in the conductive state.

S201

The first control unit 51 determines whether or not an abnormality has occurred in the auxiliary battery 30. The abnormality of the auxiliary battery 30 refers to an abnormality that unintentionally affects the electric power supplied from DC-DC converters 20 to the auxiliary loads 101, 102, and 103, such as a ground fault or a sky fault.

When the first control unit 51 determines that an abnormality has occurred in the auxiliary battery 30 (abnormality detection), the process proceeds to S204 (S201, Yes). On the other hand, when the first control unit 51 determines that no anomaly has occurred in the auxiliary battery 30 (S201, none), the process proceeds to S202.

S202

The second control unit 52 determines whether or not a "voltage UP request" requesting an increase in the output voltage of DC-DC converters 20 has been received from at least one of the auxiliary loads 101, 102, and 103. This voltage UP requirement is a prerequisite for the implementation of a particular operation, with the aim of preventing an extreme drop in the supply voltage due to a particular operation consuming a large current implemented in the auxiliary load (a change that is less than the lower limit of the operable voltage of the auxiliary load). In the present embodiment, since the auxiliary battery 30 is a lithium-ion battery (LiB), a voltage UP demand for raising the output voltage of DC-DC converter 20 to a voltage exceeding the use allowable voltage range of the lithium-ion battery is set as a determination target.

If the second control unit 52 determines that UP has been received from the auxiliary loads (S202, yes), the process proceeds to S203. On the other hand, if the second control unit 52 determines that the voltage UP request has not been received from the auxiliary load (S202, none), the process proceeds to S201.

S203

The first control unit 51 determines whether or not the auxiliary battery 30 is in a charged state. This determination is made in order to confirm that the present state of DC-DC converters 20 is in a state where there is a margin in the power supplying capability (such as a predetermined margin with respect to the rated power) so that the auxiliary battery 30 can be charged. When the auxiliary battery 30 is discharged, it can be inferred that the auxiliary loads 101, 102, and 103 consume a large amount of power that is not sufficient to supply DC-DC converters 20 alone.

When the first control unit 51 determines that the auxiliary battery 30 is in the charged state (S203, Yes), the process proceeds to S205. On the other hand, when the first control unit 51 determines that the auxiliary battery 30 is not in the charged state (S203, No), the process proceeds to S201.

S204

The first control unit 51 and the second control unit 52 execute SW cutoff process (FIG. 3) according to the first sequencing based on the abnormal occurrence of the auxiliary battery 30 in order to switch the switch 40 from the conductive state to the cutoff state. SW blocking process according to the first sequencing will be described later. When the switch 40 is shut off according to the first sequence, SW shut-off determination control is ended.

S205

The first control unit 51 and the second control unit 52 execute SW cutoff process (FIG. 4) according to the second sequencing based on the voltage UP demand from the auxiliary load in order to switch the switch 40 from the conduction state to the cutoff state. SW blocking process according to the second sequencing will be described later. When the switch 40 is shut off according to the second sequence, SW shut off determination control ends.

1-1. SW Cutoff Process in the First Sequence

Figure 3:
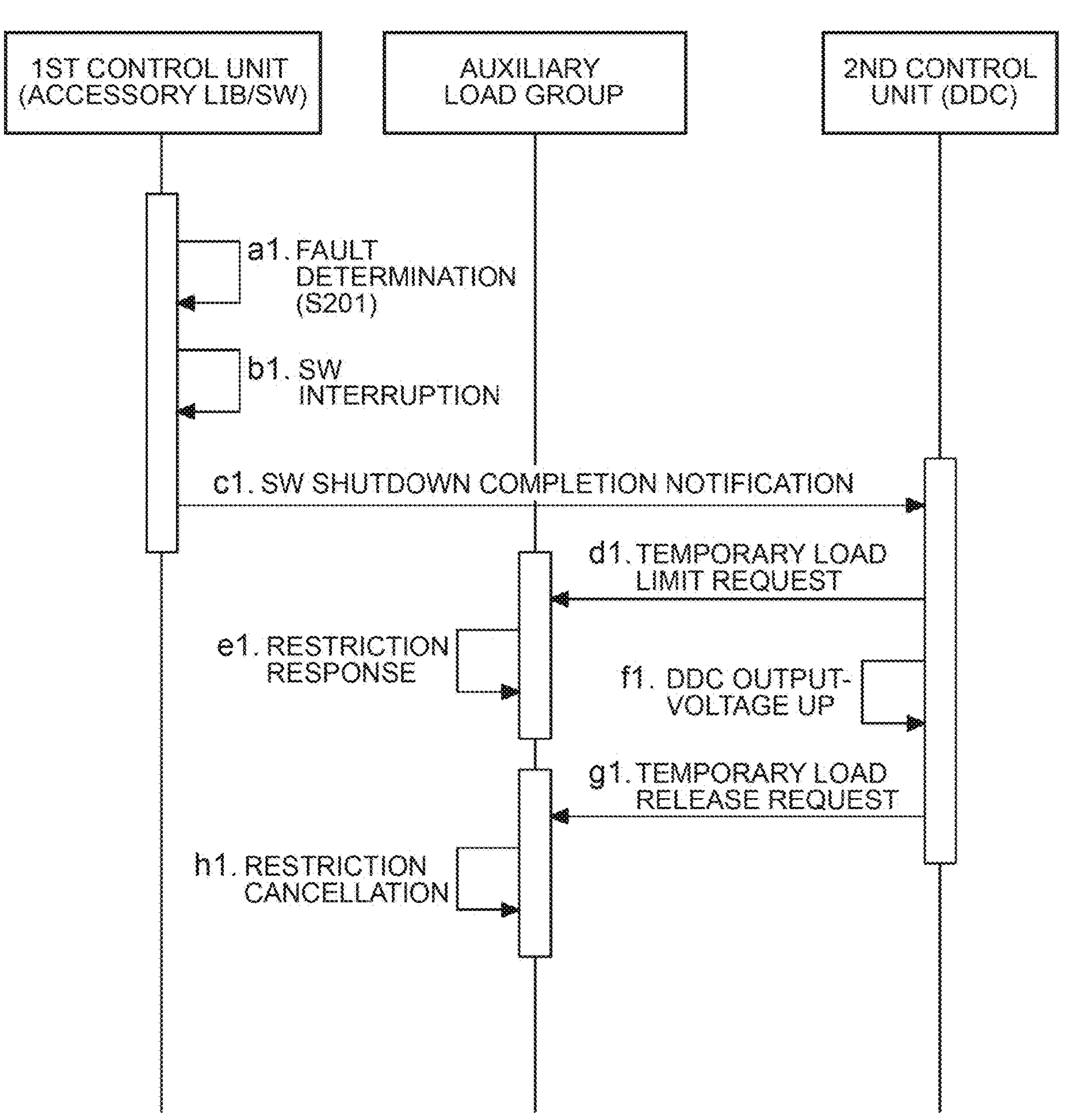
FIG. 3 is a first sequence diagram of a switch cutoff process in the switch cutoff determination control.

Referring to FIG. 3, SW interruption process by a first sequence performed by the first control unit 51, the second control unit 52, and the auxiliary loads 101, 102, and 103 will be described. In this first sequence, h1. is executed from the following sequence a1.

a1: The first control unit 51 determines an anomaly of the auxiliary battery 30 (S201 in FIG. 2).

b1: The first control unit 51 switches the switch 40 from the conductive state to the disconnected state.

c1: The first control unit 51 transmits, to the second control unit 52, a SW cutoff completion notification indicating that the switch 40 has been switched to the cutoff state.

d1: The second control unit 52 transmits, to the auxiliary loads 101, 102, and 103, a temporary load limit request instructing the auxiliary load to temporarily limit the current consumption in response to the reception of SW interruption completion notification. This temporary load-limiting requirement is a requirement for suppressing the operation of a function that generates a power demand that exceeds the rated performance of DC-DC converters 20. For example, the temporary load limit request may be a limit request issued for a function related to comfort that does not affect the "running," "turning," or "stopping" behavior in a vehicle. The temporary load limit request also includes a meaning of notifying the auxiliary loads 101, 102, and 103 that voltage fluctuations are likely to occur.

Procedure e1: The auxiliary loads 101, 102, and 103 each implement a restriction response in response to receiving a temporary load restriction request.

f1: The second control unit 52 performs a process of increasing (UP) the output voltage of DC-DC converters 20 from the first voltage to the second voltage. The first voltage is the output voltage of DC-DC converter 20, which is set when the switch 40 is conductive and the auxiliary battery 30 is connected to DC-DC converter 20. The second voltage is the output voltage of DC-DC converter 20, which is set when the switch 40 is shut off and the auxiliary battery 30 is disconnected from DC-DC converter 20. The second voltage may be, for example, the highest voltage that can be outputted by DC-DC converters 20.

g1: The second control unit 52 transmits, to the auxiliary loads 101, 102, and 103, a temporary load limit release request instructing to cancel the limit of the increase in the consumed current instructed to the auxiliary load after the output voltage of DC-DC converter 20 rises. The temporary load limit release request also includes a notification that the auxiliary loads 101, 102, and 103 are unaffected by voltage fluctuations (fluctuations can be absorbed).

Procedure h1: The auxiliary loads 101, 102, and 103 each implement a response to the deregulation in response to receiving a temporary load release request.

Note that the above-described procedure e1 and procedure f1 may be performed before and after the process. That is, the output-voltage of DC-DC converters 20 may be increased prior to the auxiliary loads 101, 102, and 103 completing their respective limiting responses in response to the temporary load limiting requirements.

1-2. Second Sequencing SW Shutdown Process

Figure 4:
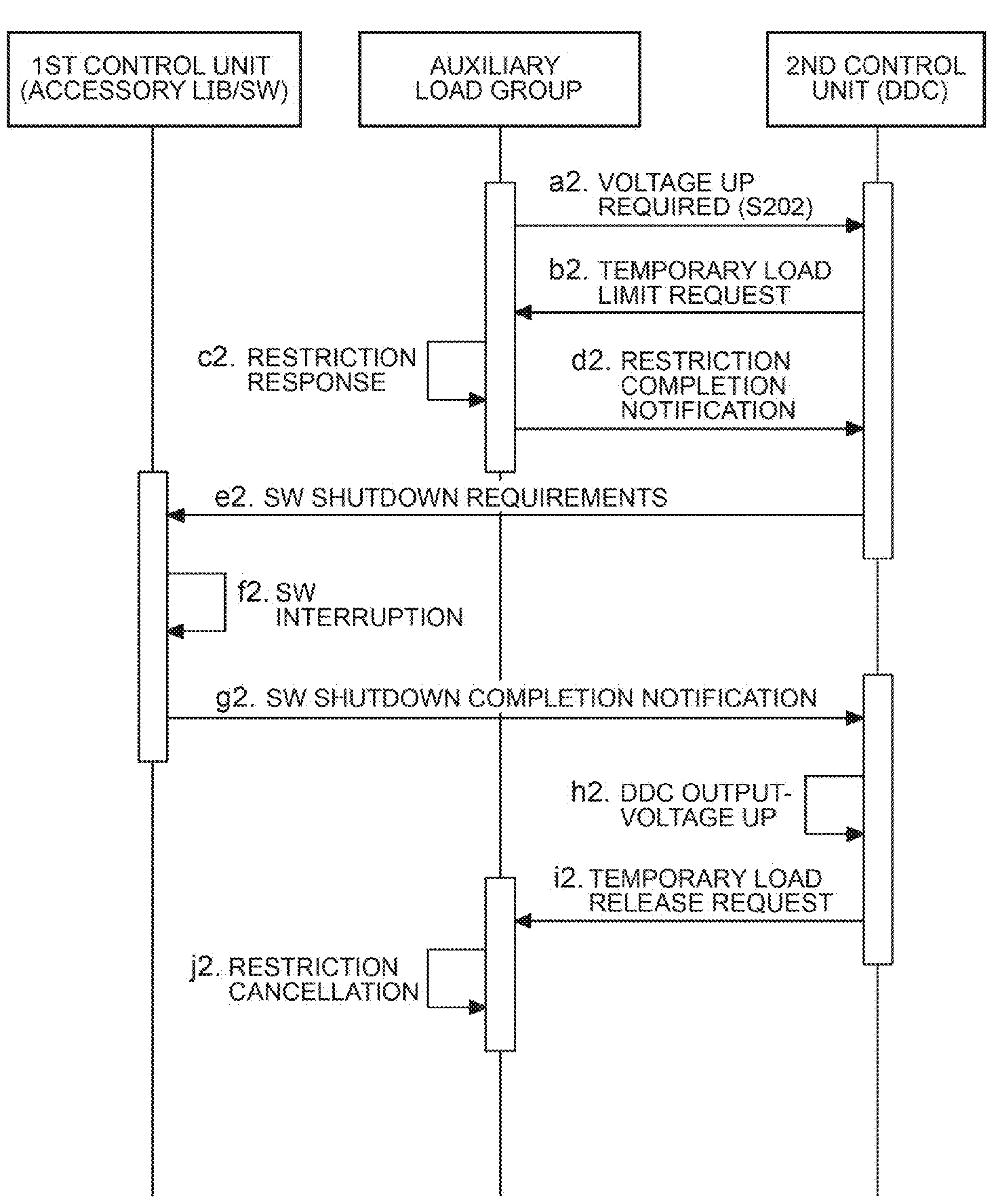
FIG. 4 is a second sequence diagram of a switch cutoff process in the switch cutoff determination control.

Referring to FIG. 4, a SW cutoff process according to the second sequencing executed by the first control unit 51, the second control unit 52, and the auxiliary loads 101, 102, and 103. In this second sequence, j2. is executed from the following sequence a2.

a2: The second control unit 52 receives a UP request from at least one of the auxiliary loads 101, 102, and 103 (S202 of FIG. 2).

Procedure b2: The second control unit 52 transmits a temporary load limit request instructing the auxiliary load to temporarily limit the increased current consumption to the auxiliary loads, to the auxiliary loads 101, 102, and 103, in response to receiving the voltage UP request. This temporary load-limiting requirement is a requirement for suppressing the operation of a function that generates a power demand that exceeds the rated performance of DC-DC converters 20. For example, the temporary load limit request may be a limit request issued for a function related to comfort that does not affect the "running," "turning," or "stopping" behavior in a vehicle. The temporary load limit request also includes a meaning of notifying the auxiliary loads 101, 102, and 103 that voltage fluctuations are likely to occur.

Procedure c2: The auxiliary loads 101, 102, and 103 each implement a restriction response in response to receiving a temporary load restriction request.

Procedure d2: The auxiliary loads 101, 102, and 103 transmit a restriction completion notification indicating that the restriction correspondence has been completed to the second control unit 52.

e2: The second control unit 52 transmits, to the first control unit 51, a SW cutoff request requesting that the switch 40 be shut off.

f2: The first control unit 51 switches the switch 40 from the conductive state to the disconnected state in response to the reception of SW disconnection request.

g2: The first control unit 51 transmits, to the second control unit 52, a SW cutoff completion notification indicating that the switch 40 has been switched to the cutoff state.

h2: The second control unit 52 performs a process of increasing (UP) the output voltage of DC-DC converters 20 from the first voltage to the second voltage. The first voltage is the output voltage of DC-DC converter 20, which is set when the switch 40 is conductive and the auxiliary battery 30 is connected to DC-DC converter 20. The second voltage is the output voltage of DC-DC converter 20, which is set when the switch 40 is shut off and the auxiliary battery 30 is disconnected from DC-DC converter 20. The second voltage may be a maximum voltage that can be outputted by DC-DC converters 20, or may be a value specified by a voltage UP request (for example, a maximum value when there are a plurality of requests).

i2: The second control unit 52 transmits, to the auxiliary loads 101, 102, and 103, a temporary load limit release request instructing to cancel the limit of the increase in the consumed current instructed to the auxiliary load after the output voltage of DC-DC converter 20 rises. The temporary load limit release request also includes a notification that the auxiliary loads 101, 102, and 103 are unaffected by voltage fluctuations (fluctuations can be absorbed).

Procedure j2: The auxiliary loads 101, 102, and 103 each implement a response to the deregulation in response to receiving a temporary load release request.

In this second sequence, the switch 40 is prevented from being shut off while the auxiliary loads 101, 102, and 103 remain likely to increase power consumption. Therefore, the second control unit 52 confirms that the restriction completion notification has been received from the auxiliary loads 101, 102, and 103 (procedure d2), and then transmits a SW interruption request to the first control unit 51 (procedure e2).

2. SW Continuity Determination Control

Figure 5:
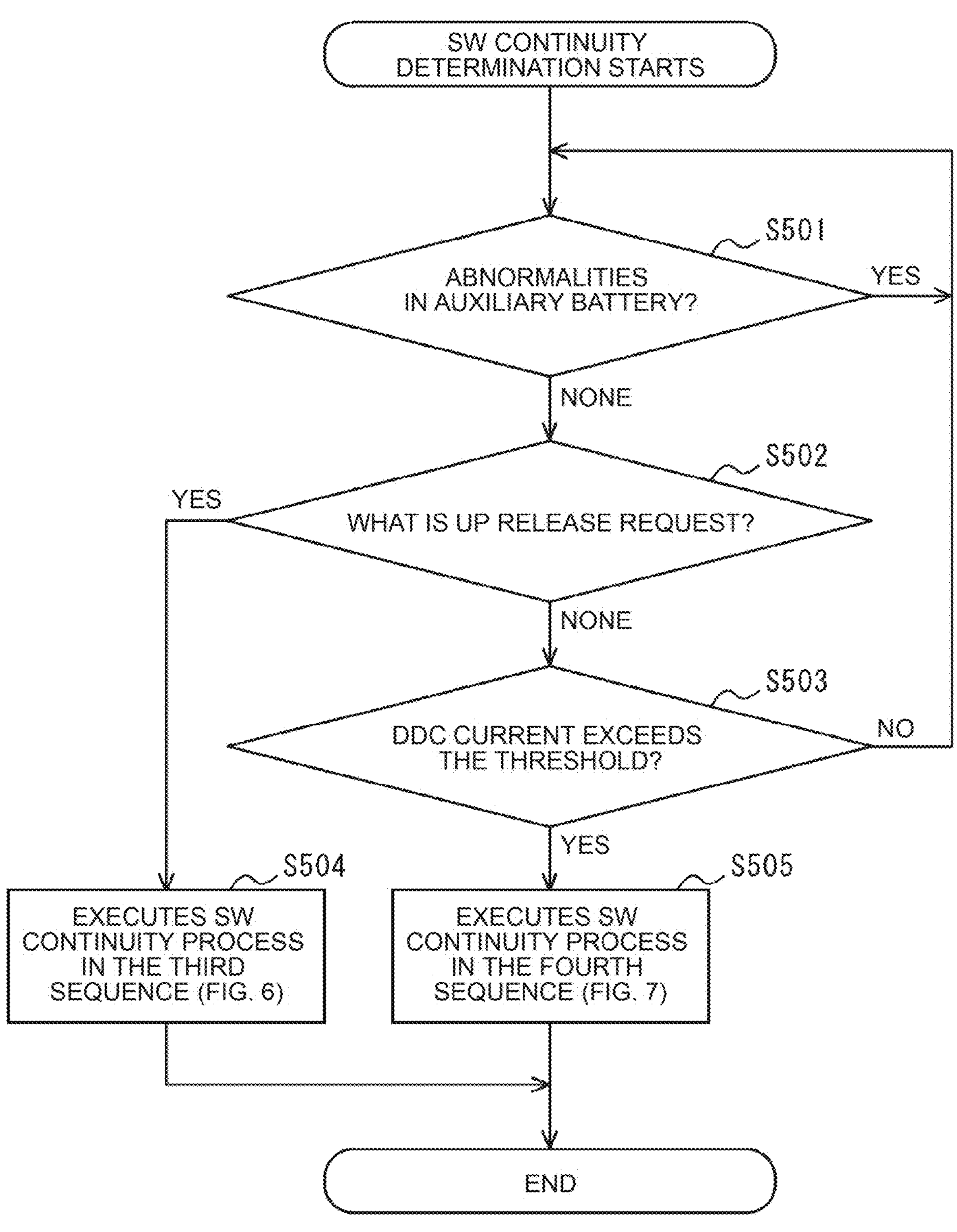
FIG. 5 is a processing flowchart of switch continuity determination control performed by the vehicle power supply device.

FIG. 5 is a flow chart for explaining a process sequence of SW continuity determination control executed by the first control unit 51 and the second control unit 52 of the vehicle power supply device 1. SW continuity determination control illustrated in FIG. 5 is executed when the switch 40 is shut off.

S501

The first control unit 51 determines whether or not there is an abnormality in the auxiliary battery 30. This determination, although the abnormality of the auxiliary battery 30 in SW cutoff determination control described above (FIG. 2) is determined, the abnormality is non-persistent auxiliary battery 30 is performed to confirm whether or not recovered to a normal state.

When the first control unit 51 determines that there is no abnormality in the auxiliary battery 30 (S501, none), the process proceeds to S502. On the other hand, when the first control unit 51 determines that the auxiliary battery 30 is abnormal (S501, Yes), the process proceeds to S501.

S502

The second control unit 52 determines whether or not a "voltage UP release request" requesting release of the output voltage rise of DC-DC converters 20 has been received from at least one of the auxiliary loads 101, 102, and 103. The voltage UP release request is a request for, for example, transmitting to the second control unit 52 that there is no longer a plan to perform a particular operation of consuming a large current in the auxiliary load.

When the second control unit 52 determines that the voltage UP release request has been received from the auxiliary load (S502, Yes), the process proceeds to S504. On the other hand, if the second control unit 52 determines that the voltage UP release request has not been received from the auxiliary load (S502, none), the process proceeds to S503.

S503

The second control unit 52 determines whether or not the output current of DC-DC converters 20 exceeds a predetermined threshold. This determination is made in order to confirm that the present state of DC-DC converters 20 is in a state where there is a margin in the power supplying capability (such as a predetermined margin with respect to the rated output current) so that the output voltage may be lowered. The thresholds are set based on standards of DC-DC converters 20 and the like. For example, when the output current of DC-DC converter 20 exceeds the threshold value, it can be easily estimated that the output voltage cannot be lowered because a large amount of current is supplied from DC-DC converter 20 to the auxiliary loads 101, 102, and 103. In this case, since DC-DC converters 20 may reach the output limit, it can be determined that it is preferable to return the auxiliary battery 30, which is normal, to the conduction state even if there is no release request for canceling the voltage UP from the auxiliary load.

When the second control unit 52 determines that the output current of DC-DC converters 20 exceeds the threshold (S503, Yes), the process proceeds to S505. On the other hand, if the second control unit 52 determines that the output current of DC-DC converters 20 does not exceed the threshold (S503, No), the process proceeds to S501.

S504

The first control unit 51 and the second control unit 52 execute SW continuity process (FIG. 6) according to the third sequencing based on the voltage UP release request from the auxiliary load in order to switch the switch 40 from the disconnected state to the conductive state. SW conduction process according to the third sequencing will be described later. When the switch 40 is turned on in the third sequence, SW continuity determination control is ended.

S505

The first control unit 51 and the second control unit 52 execute SW continuity process (FIG. 7) according to the fourth sequencing based on the normal restoration of the auxiliary battery 30 in order to switch the switch 40 from the disconnected state to the conductive state. SW conduction process according to the fourth sequencing will be described later. When the switch 40 is turned on according to the fourth sequencing, SW continuity determination control is ended.

2-1. Third-Sequence SW Continuity Process

Figure 6:
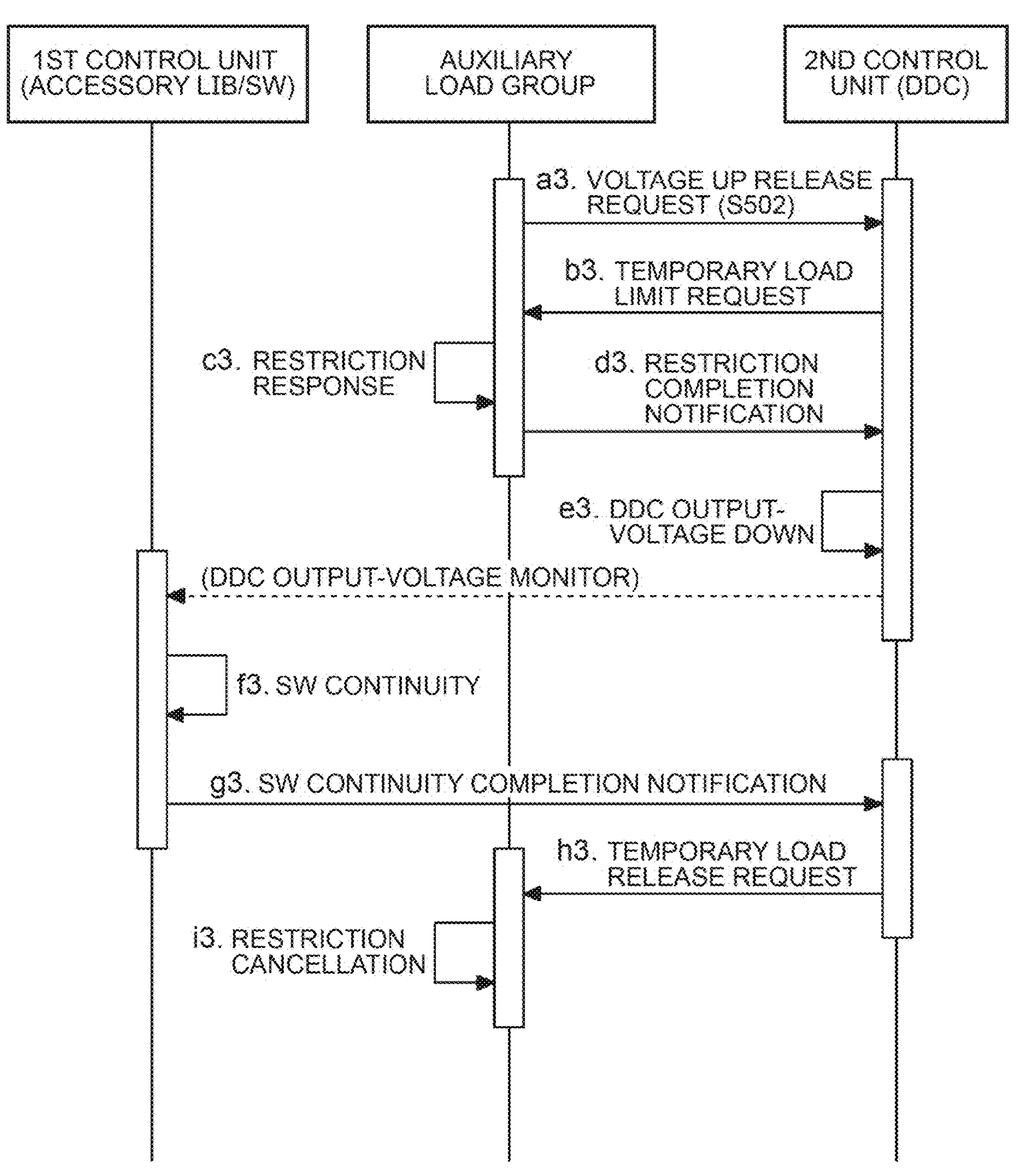
FIG. 6 is a third sequential diagram of a switch continuity process in switch continuity determination control.

Referring to FIG. 6, SW continuity process according to the third sequencing executed by the first control unit 51, the second control unit 52, and the auxiliary loads 101, 102, and 103 will be described. In this third sequence, i3. is executed from the following sequence a3.

Procedure a3: The second control unit 52 receives a voltage UP release request from at least one of the auxiliary loads 101, 102, and 103 (S502 of FIG. 5).

Procedure b3: The second control unit 52 transmits, to the auxiliary loads 101, 102, and 103, a temporary load limit request instructing the auxiliary load to temporarily limit the current consumption in response to the reception of the voltage UP release request. This temporary load-limiting requirement is a requirement for suppressing the operation of a function that generates a power demand that exceeds the rated performance of DC-DC converters 20. For example, the temporary load limit request may be a limit request issued for a function related to comfort that does not affect the “running,” “turning,” or “stopping” behavior in a vehicle. The temporary load limit request also includes a meaning of notifying the auxiliary loads 101, 102, and 103 that voltage fluctuations are likely to occur.

Procedure c3: The auxiliary loads 101, 102, and 103 each implement a restriction response in response to receiving a temporary load restriction request.

Procedure d3: The auxiliary loads 101, 102, and 103 transmit a restriction completion notification indicating that the restriction correspondence has been completed to the second control unit 52.

e3: The second control unit 52 performs a process of lowering (DOWN) the output voltage of DC-DC converter 20 from the second voltage to a predetermined voltage. The second voltage is the output voltage of DC-DC converter 20 that is set when the switch 40 is shut off and the auxiliary battery 30 is disconnected from DC-DC converter 20. The voltage to be lowered may be a first voltage that is the voltage outputted from DC-DC converter 20 that is set when the switch 40 is conductive and the auxiliary battery 30 is connected to DC-DC converter 20. The voltage value to be lowered may be a value specified by the voltage UP release request (the smallest value when there are a plurality of requests).

f3: When the first control unit 51 detects that the output-voltage of DC-DC converter 20 has dropped, the switch 40 is switched to the conductive state. This detection can be performed by the first control unit 51 constantly monitoring the output-voltage of DC-DC converters 20.

g3: The first control unit 51 transmits, to the second control unit 52, a SW conduction completion notification indicating that the switch 40 has been switched to the conduction state.

h3: In response to reception of SW conduction completion notification, the second control unit 52 transmits a temporary load limit release request instructing to release the limit of the increased current consumed, which has been instructed to the auxiliary load, to the auxiliary loads 101, 102, and 103. This temporary load limit release request also includes the meaning of notifying the auxiliary loads 101, 102, and 103 that voltage fluctuations are unlikely to occur (robustness to voltage fluctuations).

Procedure i3: The auxiliary loads 101, 102, and 103 each implement a response to the deregulation in response to receiving a temporary load release request.

The switching from the disconnected state to the conductive state (step f3) of the switch 40 is actively performed by the first control unit 51 based on the output-voltage of DC-DC converters 20. However, the switching may be performed passively by receiving a predetermined notification from the second control unit 52 after DC-DC converters 20 are stepped down (step e3).

2-2. Fourth-Sequence SW Continuity Process

Figure 7:
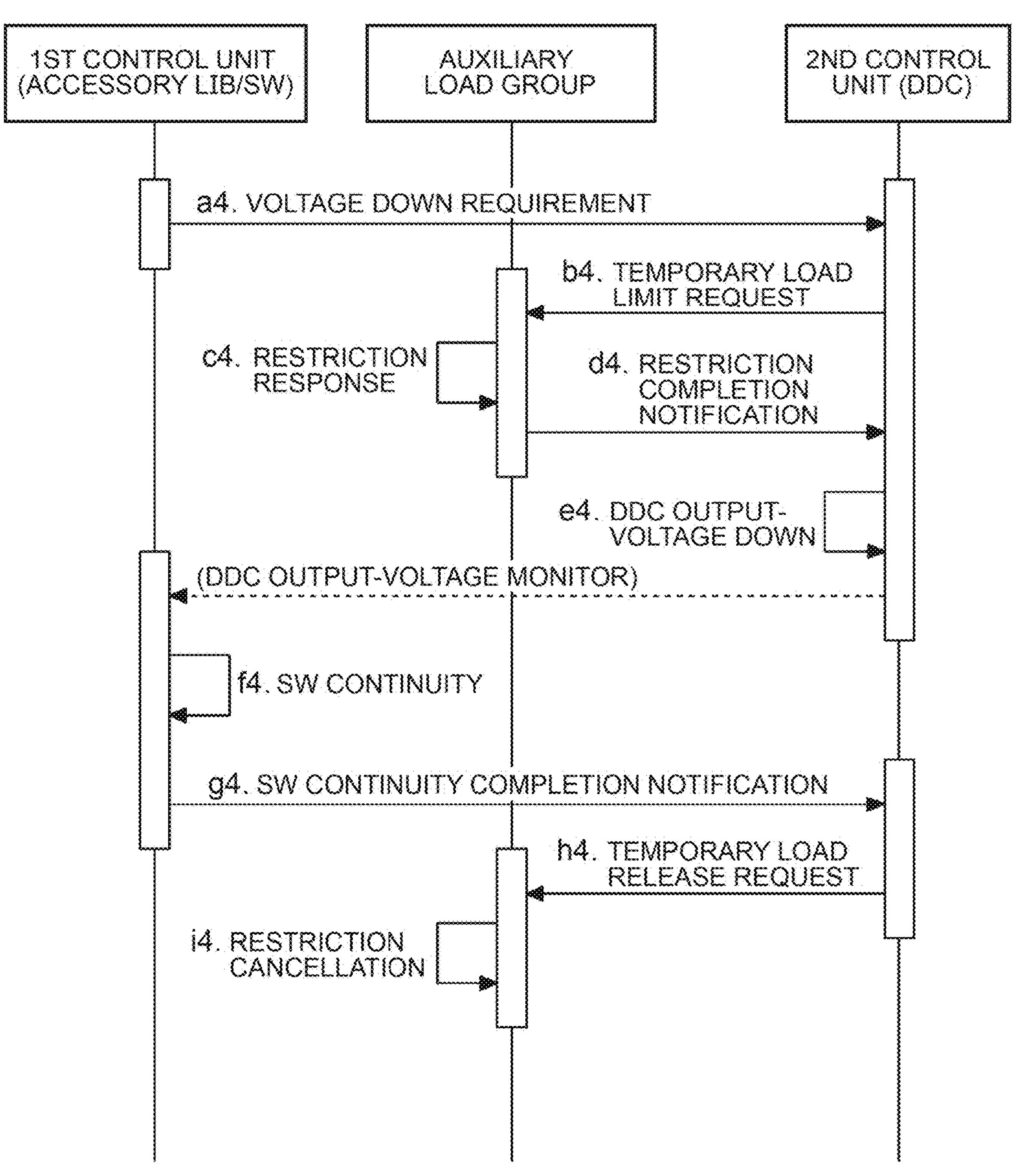
FIG. 7 is a fourth sequence diagram of switch continuity processing in switch continuity determination control.

Referring to FIG. 7, SW continuity process according to the fourth sequencing executed by the first control unit 51, the second control unit 52, and the auxiliary loads 101, 102, and 103 will be described. In this fourth sequence, i4. is executed from the following sequence a4.

a4: The first control unit 51 transmits, to the second control unit 52, a “voltage DOWN request”, which is a request for lowering the output voltage of DC-DC converters 20 that are being raised, based on the fact that the auxiliary battery 30 has returned to the normal state.

Procedure b4: The second control unit 52 transmits a temporary load limit request instructing the auxiliary load to temporarily limit the increased current consumption to the auxiliary loads, to the auxiliary loads 101, 102, and 103, in response to receiving the voltage DOWN request. This temporary load-limiting requirement is a requirement for suppressing the operation of a function that generates a power demand that exceeds the rated performance of DC-DC converters 20. For example, the temporary load limit request may be a limit request issued for a function related to comfort that does not affect the “running,” “turning,” or “stopping” behavior in a vehicle. The temporary load limit request also includes a meaning of notifying the auxiliary loads 101, 102, and 103 that voltage fluctuations are likely to occur.

Procedure c4: The auxiliary loads 101, 102, and 103 each implement a restriction response in response to receiving a temporary load restriction request.

Procedure d4: The auxiliary loads 101, 102, and 103 transmit a restriction completion notification indicating that the restriction correspondence has been completed to the second control unit 52.

e4: The second control unit 52 performs a process of lowering (DOWN) the output voltage of DC-DC converter 20 from the second voltage to a predetermined voltage. The second voltage is the output voltage of DC-DC converter 20 that is set when the switch 40 is shut off and the auxiliary battery 30 is disconnected from DC-DC converter 20. The voltage to be lowered may be a first voltage that is the voltage outputted from DC-DC converter 20 that is set when the switch 40 is conductive and the auxiliary battery 30 is connected to DC-DC converter 20. The voltage value to be lowered may be a value specified by the voltage UP release request (the smallest value when there are a plurality of requests).

f4: When the first control unit 51 detects that the output-voltage of DC-DC converter 20 has dropped, the switch 40 is switched from the disconnected state to the conductive state. This detection can be performed by the first control unit 51 constantly monitoring the output-voltage of DC-DC converters 20.

g4: The first control unit 51 transmits, to the second control unit 52, a SW conduction completion notification indicating that the switch 40 has been switched to the conduction state.

h4: In response to reception of SW conduction completion notification, the second control unit 52 transmits a temporary load limit release request instructing to release the limit of the increased current consumed, which has been instructed to the auxiliary load, to the auxiliary loads 101, 102, and 103. This temporary load limit release request also includes the meaning of notifying the auxiliary loads 101, 102, and 103 that voltage fluctuations are unlikely to occur (robust to voltage fluctuations).

Procedure i4: The auxiliary loads 101, 102, and 103 each implement a response to the deregulation in response to receiving a temporary load release request.

The switching from the disconnected state to the conductive state (step f4) of the switch 40 is actively performed by the first control unit 51 based on the output-voltage of DC-DC converters 20. However, the switching may be performed passively by receiving a predetermined notification from the second control unit 52 after the output-voltage of DC-DC converters 20 is lowered (procedural e4).

Operations and Effects

As described above, according to the vehicle power supply device 1 according to the embodiment of the present disclosure, when the auxiliary battery 30 employing the lithium-ion battery is disconnected from DC-DC converter 20 by shutting off the switch 40, the output voltage of DC-DC converter 20 after the auxiliary battery 30 is disconnected is controlled to be higher than the output voltage of DC-DC converter 20 prior to the auxiliary battery 30 being disconnected.

By this control, when the auxiliary battery 30 is disconnected from the power supply line in order to protect the auxiliary battery 30 which is a lithium-ion battery, even if the consumed current is increased due to a change in the large power demand of the auxiliary loads 101, 102, and 103, the output-voltage of DC-DC converters 20 is suppressed from being extremely lowered. This prevents a situation in which the output voltage of DC-DC converters 20 cannot respond to changes in the power demand of the auxiliary loads 101, 102, and 103 and greatly fluctuates, thereby affecting the operations of the auxiliary loads 101, 102, and 103 (unstable, stopped, and the like). Therefore, when the output-voltage of DC-DC converters 20 is turned UP, the robustness of the auxiliary load operation is improved as compared with the case where the output-voltage is not turned UP.

Further, according to the vehicle power supply device 1 according to the embodiment of the present disclosure, even if there is no abnormality in the auxiliary battery 30, when there is a voltage demand of DC-DC converters 20 exceeding the use allowable voltage range of the lithium-ion battery from the auxiliary loads 101, 102, and 103, the auxiliary battery 30 is forcibly disconnected from the power supply line.

This decoupling allows DC-DC converters 20 to be controlled in a manner that the auxiliary battery 30 is disconnected from the power supply line. Therefore, it is possible to alleviate the limitations of the product design and the control method of the auxiliary load and the apparatus, which are bound to the use allowable voltage range of the lithium-ion battery (the voltage cannot be exceeded).

Application Example 1

The procedure d1 in SW interruption process (FIG. 3) of the first sequence described above, the procedure b2 in SW interruption process (FIG. 4) of the second sequence, the procedure b3 in SW conduction process (FIG. 6) of the third sequence, and the temporary load limit request executed in the procedure b4 in SW conduction process (FIG. 7) of the fourth sequence may be transmitted to some of the auxiliary loads, rather than to all of the auxiliary loads 101, 102, and 103.

In this case, based on information such as the output voltage (rated voltage, etc.) of DC-DC converters 20 before or after the ascent, the minimum voltage at which all the auxiliary loads 101, 102, and 103 can operate stably, and the maximum consumed current and the operating time that may increase with the functional operation of the auxiliary loads, some of the auxiliary loads subject to the temporary load limit request can be determined, for example, as follows.

By activating a particular function, some auxiliary loads may be subject to a temporary load limit request, where the output voltage of DC-DC converters 20 may be below the minimum voltage at which all auxiliary loads 101, 102, and 103 may operate stably. In this case, the auxiliary load related to the driving functions of "running," "turning," and "stopping" of the vehicle may be excluded from the target. Further, the target auxiliary load may be determined based on a predetermined priority order, or may be determined in descending order of the maximum current consumption.

Application Example 2

Transmission of the temporary load limit release request executed in the procedure i2 in the procedure g1 and SW interruption process of the second sequence (FIG. 4) in SW interruption process of the first sequence (FIG. 3) described above may be performed for some of the auxiliary loads in the auxiliary loads 101, 102, and 103 that have requested the temporary load limit, rather than for all of the auxiliary loads that have requested the temporary load limit.

In this case, based on information such as the output voltage of DC-DC converters 20 after the increase (allowable upper limit voltage, etc.), the minimum voltage at which all the auxiliary loads 101, 102, and 103 can be stably operated, and the maximum current consumption that may be increased due to the function operation in each auxiliary load, and the operation time thereof, some auxiliary loads subject to the temporary load limit release request may be determined as follows, for example.

Even if a particular function is activated, some auxiliary loads that are unlikely to be below the minimum voltage at which all auxiliary loads 101, 102, and 103 can operate stably by the output voltage of DC-DC converters 20 can be subject to a temporary unlimited load release request. In this case, the number of the auxiliary loads to be subjected to the temporary load limitation is determined in accordance with the output-voltage after the increase of DC-DC converters 20. The number of target auxiliary loads may be determined based on whether or not the auxiliary loads are those related to the driving functions of "running," "turning," and "stopping" of the vehicle, or may be determined based on a predetermined priority order, or may be determined in an order in which the maximum current consumption is smaller.

Although an embodiment of the present disclosure has been described above, the present disclosure can be regarded as not only a vehicle power supply device but also a method executed by an electronic control unit mounted on a vehicle power supply device, a program for executing the method, a computer-readable non-transitory storage medium storing the program, and a vehicle equipped with a vehicle power supply device.

The vehicle power supply device of the present disclosure can be used for a vehicle or the like in which a lithium ion battery is adopted as an auxiliary battery.

What is claimed is:

1. A vehicle power supply device that supplies electric power to a plurality of auxiliary loads that is installed in a vehicle, the vehicle power supply device comprising:

a power supply source;

an auxiliary battery, including a lithium-ion battery that is chargeable by the power supply source;

a direct current (DC)-DC converter that is provided between the power supply source and the auxiliary loads, and that controls electric power supply from the power supply source to the auxiliary loads;

a switch that is provided between the DC-DC converter and the auxiliary loads, and the auxiliary battery, and that switches an electrical connection state between the auxiliary loads and the auxiliary battery; and a control unit that controls the DC-DC converter and the switch, wherein the control unit controls output voltage of the DC-DC converter such that a second voltage when the switch is interrupted is higher than a first voltage when the switch is conducting, wherein, when receiving a request from at least one of the auxiliary loads to raise the output voltage of the DC-DC converter, in a case in which the auxiliary battery is in a state of being charged, the control unit temporarily limits electric power consumed by the auxiliary loads, then interrupts the switch, and following interrupting the switch, raises the output voltage of the DC-DC converter from the first voltage to the second voltage.

2. The vehicle power supply device according to claim 1, wherein, when interrupting the switch based on an abnormality detection of the auxiliary battery, the control unit temporarily limits the electric power consumed by the auxiliary loads, and then raises the output voltage of the DC-DC converter from the first voltage to the second voltage.

3. The vehicle power supply device according to claim 2, wherein, when an abnormality of the auxiliary battery is resolved after the switch is interrupted, in a case in which a release request for raising the output voltage of the DC-DC converter is received from at least one of the auxiliary loads, the control unit temporarily limits the electric power consumed by the auxiliary loads, subsequently lowers the output voltage of the DC-DC converter from the second voltage to the first voltage, and then performs conducting of the switch.

4. The vehicle power supply device according to claim 2, wherein, when an abnormality of the auxiliary battery is resolved after the switch is interrupted, in a case in which an output current of the DC-DC converter exceeds a predetermined threshold value, the control unit temporarily limits the electric power consumed by the auxiliary loads, subsequently lowers the output voltage of the DC-DC converter from the second voltage to the first voltage, and then performs conducting of the switch.

5. The vehicle power supply device according to claim 2, wherein the control unit acquires information regarding the electric power consumed from the auxiliary loads, and decides an auxiliary load regarding which to temporarily limit the electric power consumed among the auxiliary loads, based on the information.

6. The vehicle power supply device according to claim 2, wherein the control unit temporarily limits the electric power consumed by the auxiliary loads, and then releases the temporary limit regarding the electric power consumed by the auxiliary loads once rising or lowering of the output voltage of the DC-DC converter is completed.

7. The vehicle power supply device according to claim 5, wherein the control unit temporarily limits the electric power consumed by the auxiliary loads, and then releases the temporary limit on the electric power consumed by a particular auxiliary load among the auxiliary loads, based on the information, once rising or lowering of the output voltage of the DC-DC converter is completed.

* * * * *